United States Patent [19]
Robbins

[11] Patent Number: 6,059,246
[45] Date of Patent: May 9, 2000

[54] HAT HOLDER

[76] Inventor: Eber Dewayne Robbins, P.O. Box 415, Rice, Tex. 75155

[21] Appl. No.: 08/892,297

[22] Filed: Jul. 14, 1997

[51] Int. Cl.⁷ ...................................................... A47H 1/10
[52] U.S. Cl. ............................ 248/317; 248/505; 211/31; 211/32
[58] Field of Search ................................... 248/317, 505, 248/74.3, 231.9, 309.1, 316.1; 211/30, 31, 32, 33; 2/175.3, 175.4, 417, 418, DIG. 11; 132/57.1, 58; D2/885, 895; 40/329; 140/77

[56] References Cited

U.S. PATENT DOCUMENTS

| | | | |
|---|---|---|---|
| 930,862 | 8/1909 | Kandlbinder | 211/32 |
| 2,319,747 | 5/1943 | Osborne | 24/115 A |
| 2,718,414 | 9/1955 | Knox et al. | 211/31 |
| 3,046,049 | 7/1962 | Paxton | 211/31 |
| 3,405,808 | 10/1968 | Thompson | 211/31 |
| 4,821,891 | 4/1989 | Williams | 211/31 |
| 5,033,660 | 7/1991 | Kelly | 211/31 |
| 5,083,346 | 1/1992 | Orton | 248/74.3 |
| 5,642,556 | 7/1997 | Alexander | 24/130 |
| 5,694,647 | 12/1997 | Crickmore | 2/175.3 |
| 5,781,932 | 7/1998 | Brown | 2/181 |
| 5,794,896 | 8/1998 | Hungerford, Jr. | 248/74.3 |

Primary Examiner—Ramon O. Ramirez
Assistant Examiner—Robert Lipcsik

[57] ABSTRACT

A hat holder comprising a length of stiff material that retains its shape when formed by hand. In a preferred embodiment, lariat rope or some other ductile material "with a memory" is used. The length is doubled back into a loop and pinched at opposing ends. The apparatus is then held in this position with slidably adjustable fasteners, such as a conchos, at the pinches. In a preferred embodiment, the length is formed first into a closed loop before pinching, allowing both ends to be identical in presentation and thus interchangeable in application. The crown of a hat is then received into the opening between the pinches. Movement of the fasteners toward or away from the ends allows for adjustability of the size of the opening. The ductility of the material, particularly when lariat rope is used, allows the shape of the opening to be adapted to correspond to the shape of the crown of the hat. The holder may then be fixed at one end to an overhead surface to store the hat upside down. Alternatively, using an optional pendant, the end may be suspended from a vertical surface to store the hat vertically.

20 Claims, 5 Drawing Sheets

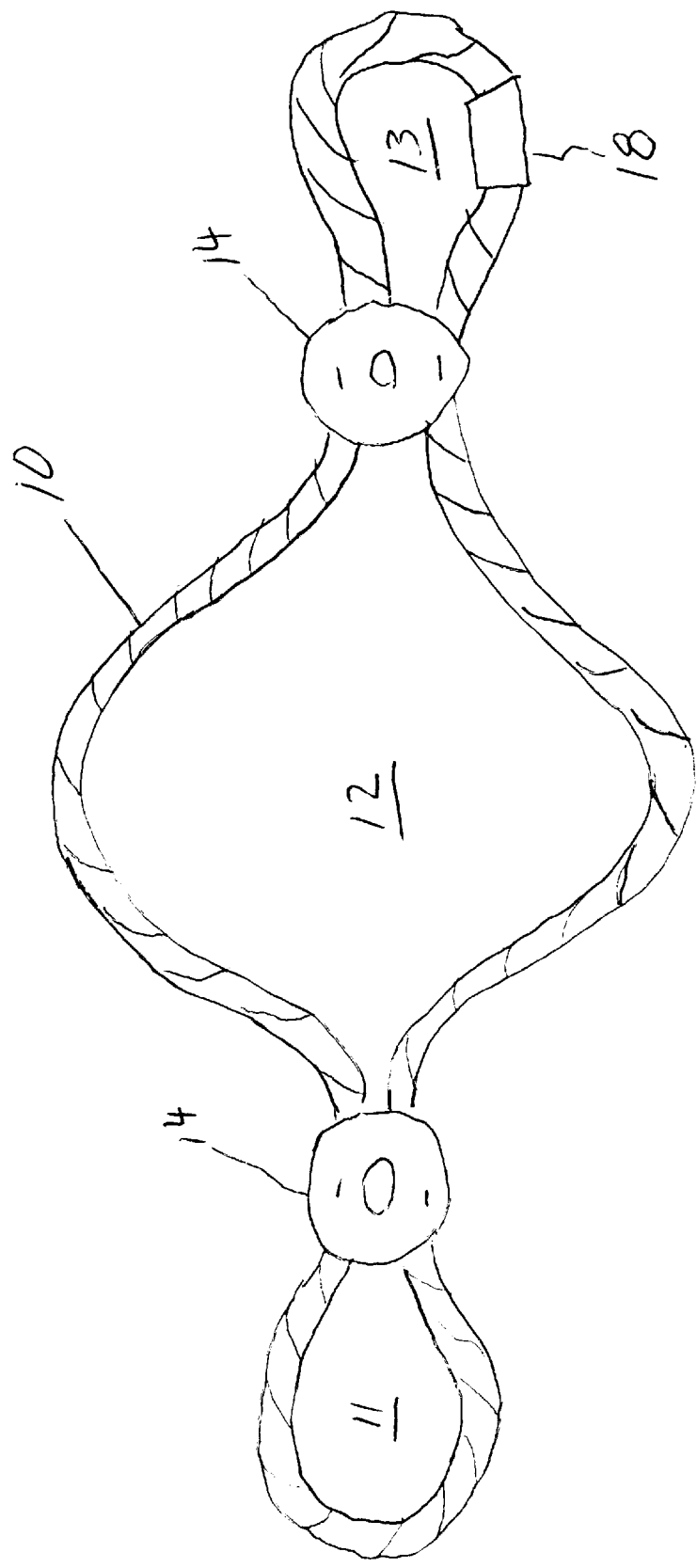

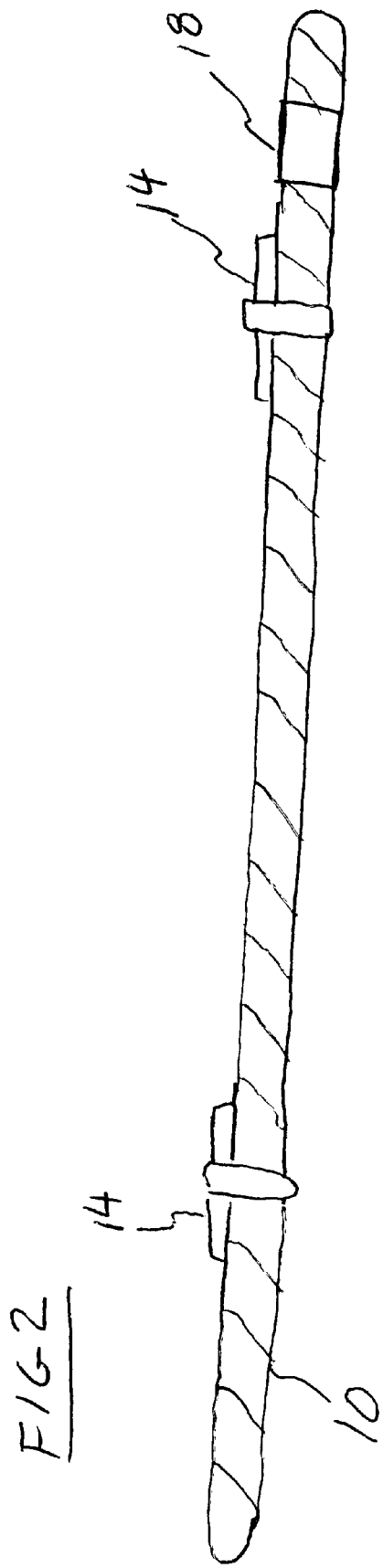

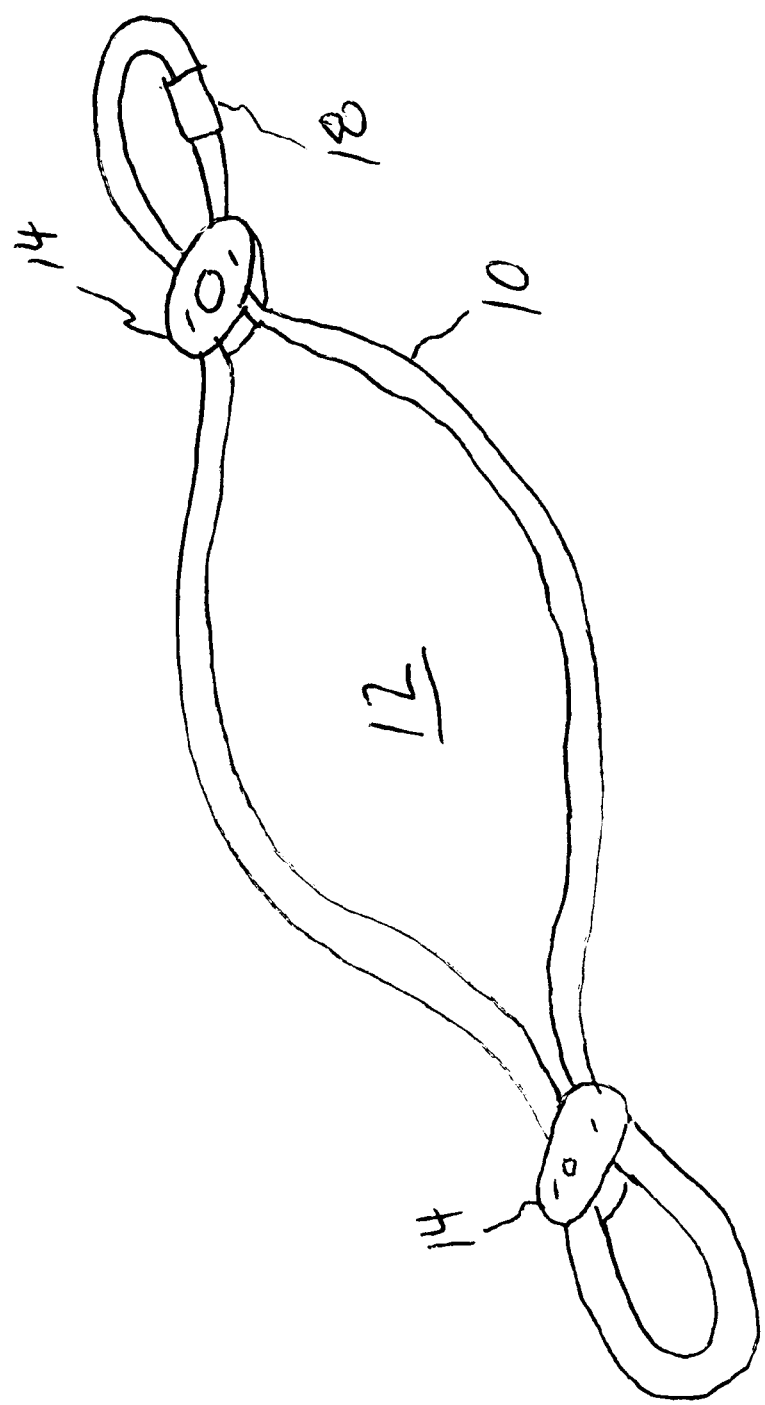

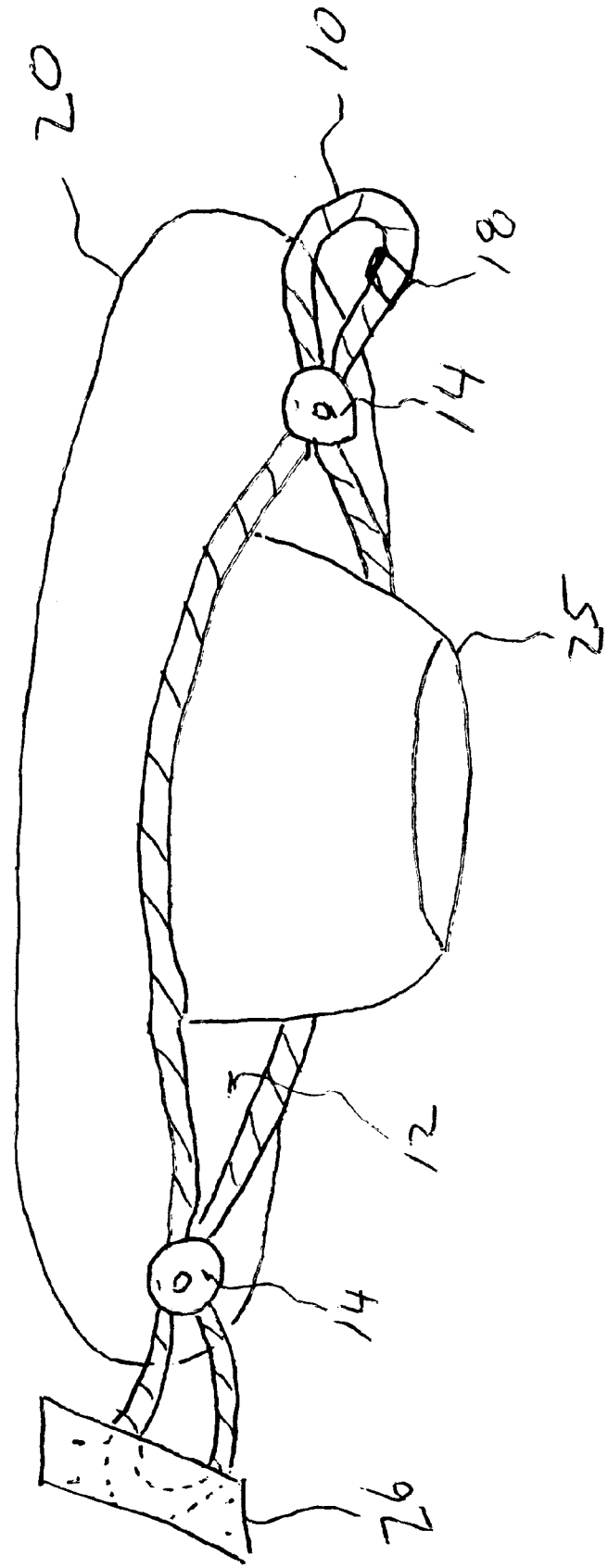

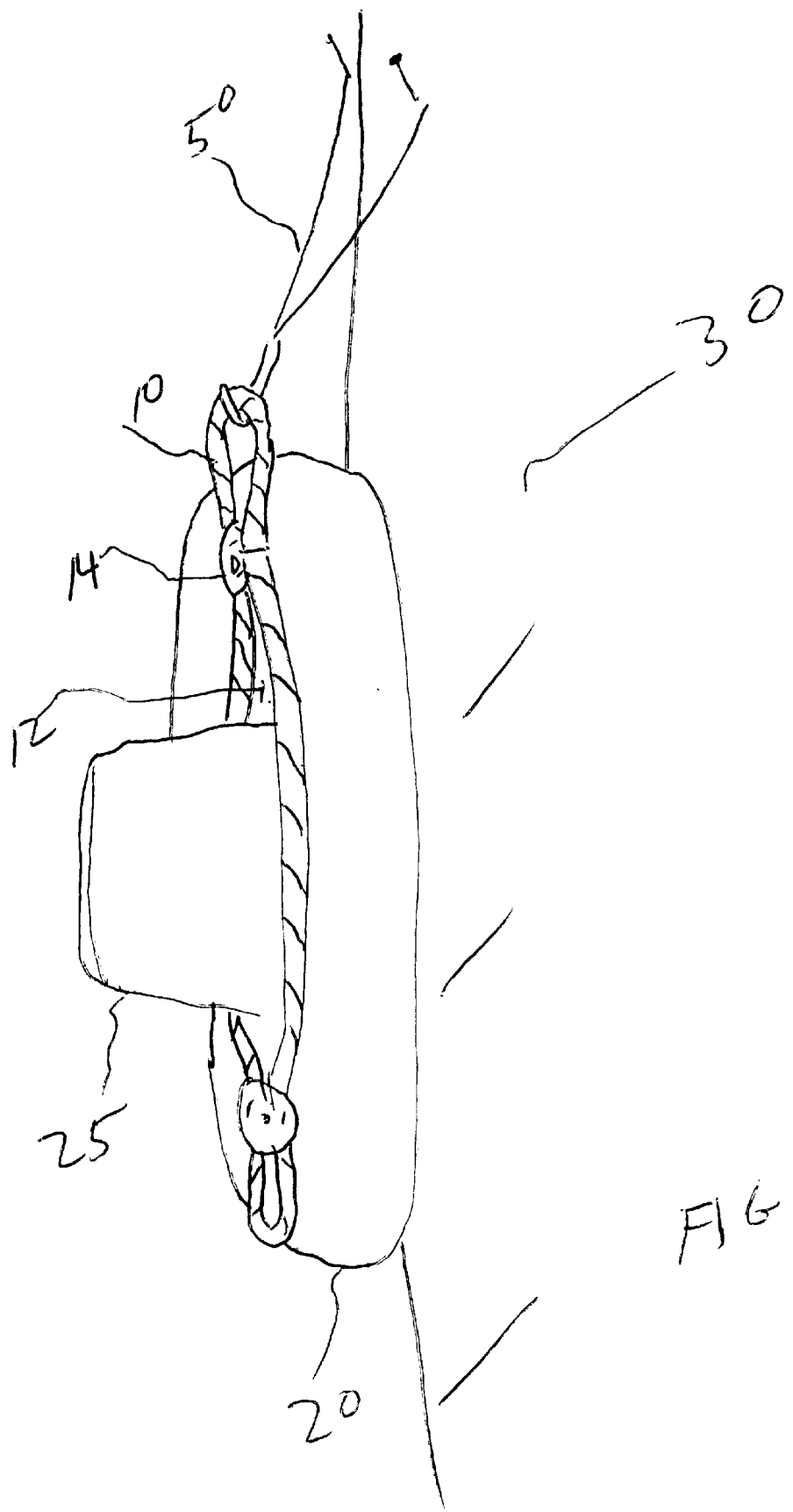

HAT HOLDER

TECHNICAL FIELD OF THE INVENTION

This application relates generally to hat holders, and more specifically to an adjustable hat holder that allows just about any hat to be suspended from a variety of vertical or overhead surfaces.

BACKGROUND OF THE INVENTION

Hat wearers often require a place to store their hats. This may be temporarily while driving, for example, or alternatively storage may be required for longer periods, in a closet or perhaps some other storage location. A useful hat holder should support the hat properly so that the shape is maintained, and neither the crown nor the brim (or bill) is exposed to damage. Also, such storage should be out of the way.

U.S. Pat. No. 3,405,808 granted to Thompson discloses a plain wire hat holder that is disposed to be screwed to the overhead interior roof surface of a vehicle. A spring hinge allows drop of a ring-shaped member to receive the hat. The hinge then returns to a rest position with the hat supported upside down from around the crown. Although this concept has enjoyed considerable commercial success, there is room for several improvements. First, there is a need for adjustability, both in size and shape of the crown to be received. Second, the unforgiving nature of the wire and the spring hinge exposes the hat to possible damage in operation of the hat holder. Third, there is a need for flexibility in the way in which the holder is suspended, since semi-permanent affixation by screws is not always either advantageous or desirable.

SUMMARY OF THE INVENTION

The present invention is a hat holder comprising a length of stiff material that retains its shape when formed by hand. In a preferred embodiment, lariat rope or some other ductile material "with a memory" is used. An alternative material is plastic-coated cable. The length is doubled back into a loop and pinched at opposing ends. The apparatus is then held in this position with slidably adjustable fasteners, such as a conchos, at the pinches. In a preferred embodiment, the length is formed first into a closed loop before pinching, allowing both ends to be identical in presentation and thus interchangeable in application.

The crown of a hat is then received into the opening between the pinches. Movement of the fasteners toward or away from the ends allows for adjustability of the size of the opening. The ductility of the material, particularly when lariat rope is used, allows the shape of the opening to be adapted to correspond to the shape of the crown of the hat. The holder may then be fixed at one end to an overhead surface to store the hat upside down. Alternatively, the end may be suspended from a vertical surface to store the hat vertically. In each application, the stiffness of the material adapts to the shape and size of the hat, and particularly its crown. The holder thus retains the hat in the stored or suspended position while maintaining some forgiveness to the hat. This is particularly important when holding expensive Western-style hats, whose crowns vary in shape and size and whose overall undamaged appearance is intrinsic to their value.

In the vertical application, the end may either be fixed to the vertical surface, or hung from a hook. Where there is no hook (say, for example, on the back of a chair), an optional pendant accessory provides a temporary hook.

It is therefore an object of the present invention to provide a hat holder that is adjustable to the shape and size of the crown of the hat being supported.

It is a further object of the present invention to provide a hat holder that is forgiving to the hat and is yet still rigid enough to provide adequate support from either overhead or vertical positions. Exposure to damage to the hat during support is thus minimized.

These and other objects of the present invention will be apparent to those skilled in this art from the detailed description of a preferred embodiment of the invention set forth below.

BRIEF DESCRIPTION OF THE DRAWINGS

This invention will be further described in connection with the accompanying drawings, in which:

FIG. 1 is a plan view of the hat holder of the present invention;

FIG. 2 is an elevation view of the hat holder of the present invention;

FIG. 3 is a perspective view of the hat holder of the present invention;

FIG. 4 is a perspective view of the hat holder of the present invention supporting a hat from overhead;

FIG. 5 is a perspective view of the hat holder of the present invention supporting a hat in the vertical position using optional pendant 50.

DETAILED DESCRIPTION OF THE INVENTION

With reference to FIGS. 1 and 2, the hat holder of the present invention comprises, in a preferred embodiment, a length of stiff, ductile material 10 advantageously, although not mandatorily, joined into a closed loop at joint 18. Material 10 may be from any suitable material "with a memory", but advantageously lariat rope is used. Alternatively, plastic-coated cable has been found also to have the required stiffness and ductility for material 10. Joint 18 may be fashioned by any suitable method, such as tying, soldering or gluing. Material 10 is then pinched, advantageously in two places, to form central void 12 separating opposing ends 11 and 13. Slidable fasteners 14 are then disposed upon the pinches to slidably hold material 10 in the shape formed by pinching. Advantageously, fasteners 14 are conchos, which have been found to hold the pinches firmly while still giving the required slidable adjustability. Conchos, when used with lariat rope for material 10, also give the hat holder a pleasing "Western"-style appearance. It will nonetheless be appreciated, however, that other forms of fastener may be used operatively for fasteners 14 to hold the hat holder's shape and to give the required slidable adjustment.

Referring now to FIG. 3, the hat holder may be seen in perspective. It will be appreciate that by adjusting the position of fasteners 14, the size of central void 12 may be adapted. Further, the ductile nature of material 10 enables the shape of central void 12 to also be fashioned by hand, while the stiff nature of material 10 causes the fashioned shape to be retained. In this way, the size and shape of central void 12 may be adjusted to receive snugly the crown of just about any hat.

Referring now to FIG. 4, the hat holder of the present invention is now depicted storing a hat upside down from overhead, such as, for example, from the interior roof of a vehicle. Crown 25 of hat 20 is received into central void 12, which has previously been adjusted as described above to fit crown 25 snugly. Attachment means 26 holds one end of the hat holder to the overhead surface. Hat 20 is inserted and removed by pulling the hat holder down at the end opposing attachment means 26. The stiff nature of material 10 causes the holder to "bounce" back and retain hat 20 close to the overhead surface.

FIG. 5 illustrates the hat holder of the present invention storing hat 20 in the vertical position. This is enabled using optional pendant 50. Pendant 50 is shown pinned to vertical surface 30 in FIG. 5, although it will be appreciated that pendant 50 may also be suspended by hanging from a suitable support in "necklace" fashion. An example of this "necklace" approach would be to hang pendant 50 from the headrest of a vehicle seat to allow a hat to be stored against the vertical surface of the back of the seat. As shown in FIG. 5, one end of the hat holder is then suspended from pendant 50, and crown 25 of hat 20 is then received into central void 12 as described above.

The invention has been shown, described and illustrated in substantial detail with reference to a presently preferred embodiment. However, it will be understood by those skilled in the art that changes and modifications may be made without departing from the spirit and scope of the invention which is defined by the claims set forth hereunder.

I claim:

1. A hat holder, comprising:

a loop of stiff but ductile material, the material disposed to be readily adapted by hand and to retain a shape formed thereby;

the loop pinched together in at least one place so as to form a central void in the loop separated from at least one end, the central void operative to receive a crown of a hat;

a fastener disposed at each place, each fastener slidably retaining the pinch at the corresponding place, slidable displacement of fasteners adjusting the size of the central void.

2. The hat holder of claim 1, in which the loop is closed.

3. The hat holder of claim 1, in which the loop is open.

4. The hat holder of claim 1, in which at least one fastener is a concho.

5. The hat holder of claim 1, in which the material is selected from the group consisting of lariat rope and plastic-coated cable.

6. The bat holder of claim 1, further comprising means for suspending the hat holder in a vertical position against a vertical surface.

7. The hat holder of claim 6, in which the means for suspending is a pendant.

8. The hat holder of claim 1, further comprising means for attaching the hat holder to a substantially horizontal overhead surface.

9. A hat holder, comprising:

a closed loop of lariat rope;

the loop pinched together in two places so as to form a central void in the loop separated from two opposing ends, the central void operative to receive a crown of a hat;

a concho disposed at each place, each concho slidably retaining the pinch at the corresponding place, slidable displacement of conchos adjusting the size of the central void.

10. The hat holder of claim 9, further comprising means for suspending one of the opposing ends in a vertical position against a vertical surface.

11. The hat holder of claim 10, in which the means for suspending is a pendant.

12. The hat holder of claim 9, further comprising means for attaching one of the opposing ends to an substantially horizontal overhead surface.

13. A method of holding a hat, comprising the steps of:

(a) forming a length of stiff but ductile material into a loop, the material disposed to be readily adapted by hand and to retain a shape formed thereby;

(b) pinching the loop in at least one place so as to form a central void separated by at least one end;

(c) slidably retaining the pinches made in step (b) with fasteners;

(d) receiving a crown of a hat into the central void;

(e) adjusting the size of the central void to suit the crown by slidably displacing the fasteners along the loop;

(f) adapting the shape of the central void by hand to suit the crown; and (g) suspending the hat in a preselected position by attaching one end of the at least end of the loop to a surface.

14. The method of claim 13, in which the loop is closed.

15. The method of claim 13, in which the loop is open.

16. The method of claim 13, in which at least one of the fasteners is a concho.

17. The method of claim 13, in which the material is selected from the group consisting of lariat rope and plastic-coated cable.

18. The method of claim 13, in which the hat is suspended in a vertical position against a vertical surface.

19. The method of claim 13, in which the hat is suspended in a vertical position against a vertical surface using a pendant.

20. The method of claim 13, in which the hat is suspended upside down from a substantially horizontal overhead surface.

* * * * *